3,337,451
ION EXCHANGE METHOD AND COMPOSITION
FOR THE DESALINATION OF WATER
Calvin Calmon, Arneys Mount, Springfield Township,
Burlington County, N.J., assignor to Pfaudler Permutit
Inc., Rochester, N.Y., a corporation of New York
No Drawing. Filed Mar. 1, 1965, Ser. No. 436,310
5 Claims. (Cl. 210—24)

ABSTRACT OF THE DISCLOSURE

A desalting high density inorganic cation exchanger composition of a cation exchange matrix material of zirconium phosphate, zirconium tungstate, zirconium molybdate, titanium phosphate, titanium tungstate, titanium molybdate, bismuth phosphate, bismuth tungstate or bismuth molybdate and exchangeable silver ions therein is formed by contacting the matrix material in an active hydrogen form with aqueous caustic to convert the material to an intermediate basic salt form; the intermediate form is washed with water and then contacted with an aqueous silver salt solution to provide a desalinating composition with a density of not less than about 0.95 g. per ml. Briquets are easily pressed from a mixture of the composition and small amounts of conventional additives such as disrupter materials.

This invention relates to compositions for the desalination of water and particularly relates to such compositions including exchangeable silver ions in association with a zirconium-based cation exchange material.

Desalting compounds have assumed increasing importance with the increased interest in space exploration and travel. The efficient utilization of space and weight is a most important consideration in this area and the reclamation of water from liquid human waste is an aspect of such utilization. Since such waste contains a substantial amount of sodium chloride, compositions for desalination are useful for that purpose. Moreover, desalting compositions are a part of the required emergency survival kits used by astronauts to provide a source of potable water until recovery efforts are completed in the event of downing at sea. Furthermore, such compositions are useful in airplane and shipboard emergency kits, desalination travel kits, etc.

In view of the above uses it is desirable to provide compositions suitable for such uses that exhibit a high capacity for salt removal relative to their weight and volume.

It is well known to provide silver ion in an exchangeable position of a cation exchange material to effect chemical desalination of seawater for use as potable water. My U.S. Patent No. 2,512,053, a method for preparing a silver alumino silicate cation exchange material having a chloride ion removal capacity of 3.4 meq. per gram, is an example of such a material. However, higher capacity cation exchange materials are desirable for use in the above enumerated applications. Accordingly, the primary object of this invention is to provide a high capacity, low volume, low weight material for the desalination of liquids, said composition including silver in the exchangeable position as a major component.

It has been found that the most useful form for desalting compositions is that of a briquet. Such briquets are formed by a brick or ovoid producing press of conventional type effecting a compression of up to 50 tons per square inch. In some instances it may be desirable to preheat the materials prior to briquetting or to briquet in a heated press. However, not all ion-exchange materials suitable for desalting are suitable for briquetting. Some materials cannot be briquetted without the inclusion of substantial amounts of additive to enhance agglomeration and prevent crumbling and fragility in subsequent handling and packaging. Obviously the minimization of such additives is an essential factor in providing a desalting composition suitable for inclusion in a high capacity, low volume, low weight briquet. It is thus another object of this invention to provide a desalination ion exchange material that is suitable for briquetting without the inclusion of significant amounts of agglomerating additions.

Among the cation exchange materials presently known are various organic types. However, organic cation exchange materials swell or absorb water so that the yield of potable water is reduced. In addition, organic desalination materials often are not stable at elevated temperatures. It is therefore an object of this invention to provide an insoluble stable high-capacity inorganic cation exchange desalination material.

Recently, it has been discovered that zirconium phosphate behaves as a cation exchanger; however, heretofore it has not been possible to prepare a substantially completely silver-substituted form of a zirconium-based exchange material. Accordingly, a basic object of this invention is to provide a method for preparing a substantially completely silver-substituted form of a zirconium-based cation exchange material.

I have found that a sustantially completely silver-substituted zirconium-based cation exchanger that accomplishes the objects of this invention is obtained by converting zirconium-based cation exchange material to the sodium form and then impregnating said material with silver ions to effect an exchange between the active sodium of the zirconium-based cation exchanger and the impregnating silver. Exchange materials according to this invention have chloride removal capacities as high as 5.5 meq./gm.

In accordance with this invention, a zirconium-based cation exchange material is placed in a mild caustic solution for approximately 2–20 hours, or longer if desired. This effects a conversion of the zirconium-based material to a cation form of the caustic solution. The resulting solution is then rinsed with a mixed-bed demineralized water and permitted to stand for a period of from 2–20 hours in a silver salt solution, preferably silver nitrate. The slurry formed is then separated into its liquid and solid components after which the solids are rinsed and allowed to dry.

The resulting materials have a chloride removal capacity of about 3.4–5.5 meq./g. The density of such material (dry-tapped down) is approximately 0.95 g./ml.

The following specific examples are provided to further illustrate the practice of my invention.

Example I

Ten grams of commercial zirconium phosphate (R–79721–427 supplied by the TAM Division of National Lead Co.) was placed in approximately 100 ml. of 5% NaOH solution and allowed to stand overnight. The resultant material was rinsed several times by decantation and then soaked overnight in 100 ml. of 10% $AgNO_3$ solution. The slurry formed was then centrifuged to separate the solids, which were washed by decantation and then dried at 105° C. The resulting material was found to be a silver form zirconium phosphate exchanger with a capacity of 3.42 meq./g. for chloride ions.

Example II

A zirconium phosphate gel was prepared by the addition of $ZrO(NO_3)_2 2H_2O$ to $H_3PO_4$ and separation of the gel from the resulting mixture. The resulting gel was treated with an approximately 10% solution of AgNO₃, but without a prior treatment with sodium hydroxide. The resulting gel exhibited a chloride capacity of 0.17 meq./g.

*Example III*

A portion of commercially prepared zirconium phosphate impregnated with silver at a pH of 7 after a NaOH treatment, exhibited a capacity of 3.96 meq./g. for chloride ions and 2.32 meq./gm. for cations.

*Example IV*

A portion of zirconium phosphate similar to that of Example II impregnated with silver at a pH of 11 exhibited a chloride capacity of 3.83 meq./g. but the cation capacity was only 0.33 meq./g.

Examples I and II illustrate the necessity of the intermediate conversion step, wherein the exchange material is first converted to a sodium form and then to the silver form.

Examples III and IV illustrate the effect of pH and the resultant silver precipitation. Our studies have shown that at higher pH higher capacities for chloride ion may be obtained without a corresponding capacity for cations. This appears to indicate that within materials impregnated at higher pH, a precipitate such as silver phosphate or silver oxide is formed, which reacts with and removes chloride ions from solution as silver chloride, but which does not remove other cations (such as magnesium) as a result of precipitation due to the elevation of the pH. Accordingly, when it is desirable to maintain high capacity for both chloride ions and cations, precipitation of silver within the exchange material should be avoided.

It is well known to include within the composition of a desalting briquet other components such as a disrupter, a material to remove objectionable organic material, a lubricant, and an anion removing material such as barium oxide (for sulfate removal). The use of such materials is within the purview of my invention and the amounts can be varied in accordance with the intended application.

In practice, the cation exchanger in accordance with my invention is pressed into a briquet, including the above enumerated materials as desired. The briquet is then positioned within a flexible container, provided with a filter. The material to be purified is passed into the container, allowed to mix with the desalting composition and then removed through the filter.

By the term zirconium-based cation exchange materials I mean zirconium phosphates, zirconium tungstates and zirconium molybdates in either gelatinous or crystalline forms. These compounds can be represented in a generalized form that is believed to be their chemical composition; however it should be recognized that these representations are by way of theoretical illustration and should not be interpreted as limitations. For example, zirconium phosphate may be represented as: $Zr(HPO_4)_2 \cdot H_2O$. Assuming this or a similar structure to illustrate the compound, it is seen that hydrogen is replaceable in an exchange process to varying degrees. Therefore, such materials may be designated as active hydrogen inorganic exchange materials.

I have also found that titanium and bismuth compounds with structures corresponding to the zirconium compounds described above provide useful desalting compositions with improved capacities. For example, a sample of a commercially available titanium phosphate, when impregnated with silver, exhibited a capacity for chloride ions from seawater of 3.5 meq./g. of silver form exchanger and a capacity for cations of 3.67 meq./g. of silver form exchanger. Accordingly, this invention is not limited to zirconium-based exchange materials, but also includes titanium- and bismuth-based cation exchange materials having exchangeable silver ions.

The high density high capacity briquets prepared according to the present invention provide a capacity per unit volume that is 30% higher than similar presently available materials (such as alumino silicates). Therefore, this invention makes possible the preparation of briquets with the same capacity and profile as those presently being manufactured but with less than 80% of the present thickness.

Accordingly, this invention achieves its basic objects of providing a novel silver impregnated inorganic exchange material having the desirable properties of increased density and increased capacity per unit volume.

It should be understood that the present invention is not limited by the illustrations and examples disclosed, but includes variations and modifications within the scope of the appended claims.

I claim:

1. A desalination composition consisting essentially of an inorganic cation exchange matrix material, said material selected from the group consisting of zirconium phosphate, zirconium tungstate, zirconium molybdate, titanium phosphate, titanium tungstate, titanium molybdate, bismuth phosphate, bismuth tungstate and bismuth molybdate, and exchangeable silver ions within said matrix material.

2. A desalting briquet comprising a cation exchanger consisting of an inorganic cation exchange material matrix based upon an element selected from the group consisting of zirconium, titanium and bismuth, said exchange material selected from the group consisting of zirconium phosphate, zirconium tungstate, zirconium molybdate, titanium phosphate, titanium tungstate, titanium molybdate, bismuth phosphate, bismuth tungstate and bismuth molybdate, having exchangable silver ions within said matrix.

3. A briquet according to claim 2 having a density of not less an 0.95 g. per ml.

4. A method of preparing an inorganic cation exchange material having silver ions in an exchangeable position comprising the following steps:
   (a) contacting an active hydrogen inorganic cation exchange material based upon an element selected from the group consisting of zirconium, titanium and bismuth, said exchange material selected from the group consisting of zirconium phosphate, zirconium tungstate, zirconium molybdate, titanium phosphate, titanium tungstate, titanium molybdate, bismuth phosphate, bismuth tungstate and bismuth molybdate, with a basic solution to convert said material to an intermediate basic form;
   (b) rinsing said material;
   (c) contacting said material with a silver salt solution for a time sufficient to convert it from said basic form to a silver form.

5. A method of desalting water comprising the steps of preparing a cation exchange material by:
   (a) contacting an active hydrogen inorganic cation exchange material based upon an element selected from the group consisting of zirconium, titanium, and bismuth, said exchange material selected from the group consisting of zirconium phosphate, zirconium tungstate, zirconium molybdate, titanium phosphate, titanium tungstate, titanium molybdate, bismuth phosphate, bismuth tungstate and bismuth molybdate, with a basic solution to convert said material to an intermediate basic form;
   (b) rinsing said material;
   (c) contacting said material with a silver salt solution for a time sufficient to convert it from said basic form to a silver form;
   (d) contacting said water with the silver form cation exchange material;
   (e) and filtering the water from the solids obtained.

(References on following page)

References Cited

UNITED STATES PATENTS

| 2,512,053 | 6/1950 | Calmon | 23—113 |
| 2,600,719 | 6/1952 | Wood | 210—28 X |
| 2,689,829 | 9/1954 | Calmon | 210—28 X |

OTHER REFERENCES

Chem. and Eng. News, 39 (41), p. 47, Oct. 9, 1961.
Helfferich, F.: Ion Exchange, p. 14, McGraw-Hill Book Co., Inc., New York (1962).

MORRIS O. WOLK, *Primary Examiner.*
S. MARANTZ, *Assistant Examiner.*